(12) United States Patent
Majoe

(10) Patent No.: US 8,349,020 B2
(45) Date of Patent: Jan. 8, 2013

(54) ARTIFICIAL MUSCLES

(76) Inventor: Dennis Majoe, Eastleigh (GB)

(*) Notice: Subject to any disclaimer, the term of this patent is extended or adjusted under 35 U.S.C. 154(b) by 106 days.

(21) Appl. No.: 12/747,814

(22) PCT Filed: Dec. 15, 2008

(86) PCT No.: PCT/GB2008/051190
§ 371 (c)(1),
(2), (4) Date: Jun. 11, 2010

(87) PCT Pub. No.: WO2009/077785
PCT Pub. Date: Jun. 25, 2009

(65) Prior Publication Data
US 2010/0268352 A1    Oct. 21, 2010

(30) Foreign Application Priority Data

Dec. 14, 2007 (GB) .................... 0724489.0

(51) Int. Cl.
A61F 2/72 (2006.01)
A61F 2/08 (2006.01)
(52) U.S. Cl. ........... 623/26; 623/14.13; 60/508; 60/515; 92/92; 446/199
(58) Field of Classification Search .................... 623/26, 623/14.13; 606/508–515; 92/92–94; 446/199
See application file for complete search history.

(56) References Cited

U.S. PATENT DOCUMENTS
3,570,814 A    3/1971 Zuppiger

FOREIGN PATENT DOCUMENTS

| DE | 2437456 A1 | 2/1976 |
| DE | 3416407 A1 | 11/1985 |
| DE | 3611794 A1 | 10/1987 |
| DE | 3615631 A1 | 11/1987 |
| EP | 0246203 A2 | 11/1987 |
| GB | 1184330 | 3/1970 |
| JP | 61-223305 A | 10/1986 |
| WO | WO02/23050 A1 | 3/2002 |

Primary Examiner — Bruce E Snow

(57) ABSTRACT

An artificial muscle (10) comprises a chamber (12) having a flexible wall of plastics material, a device for heating and/or cooling a low-boiling-point fluid contained in, or in communication with, the chamber so that at least some of the fluid changes state between liquid and gaseous so that the force in the chamber on the flexible wall changes and/or the flexible wall moves to change the volume of the chamber, and a tendon (14) which at least partly encircles the chamber over an extent that varies with variations in the chamber volume for transmitting force between the flexible wall and a load. The use of a low-boiling-point fluid operating at around its boiling point enables plastics materials to be used without thermal damage, and the use of plastics materials enables low production costs. The use of a flexible wall to convey an effort to a load avoids the need for sliding parts and can provide advantages such as reduced friction and ease of sealing. The use of a low-boiling-point fluid operating at around its boiling point also enables large changes in pressure to be achieved with relatively small changes in temperature, so that the muscle can operate over a relatively small temperature range. The use of a low-boiling-point fluid operating at around its boiling point also reduces the risk of personal injury. The tendon arrangement provides less of a restriction on the operating range of the muscle than a McKibben type arrangement.

14 Claims, 6 Drawing Sheets

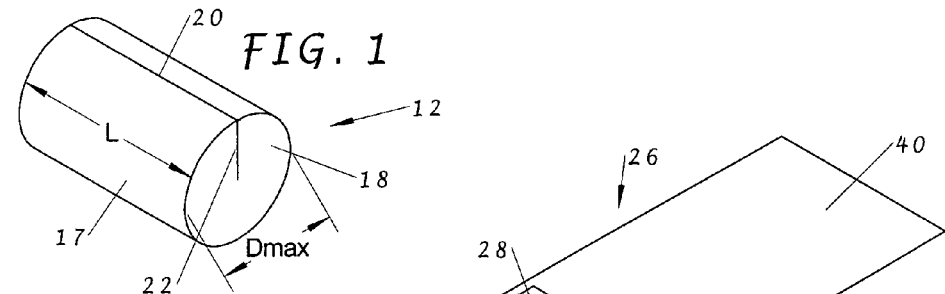
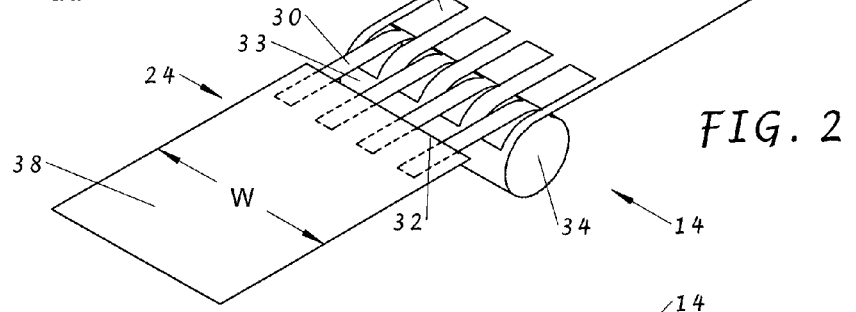
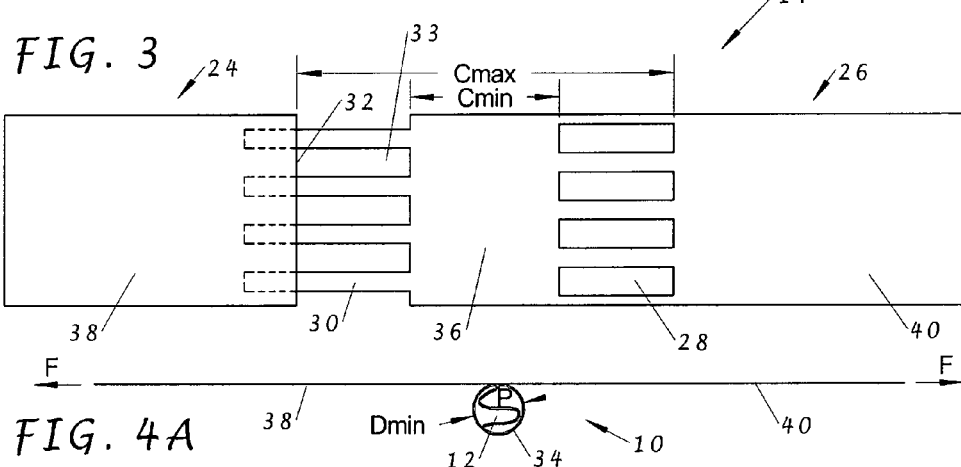
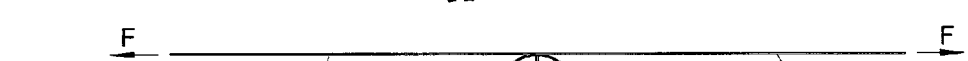
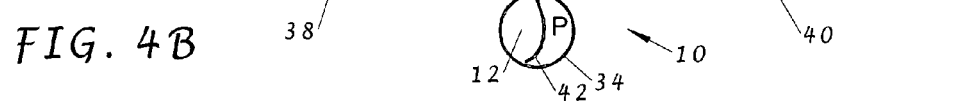
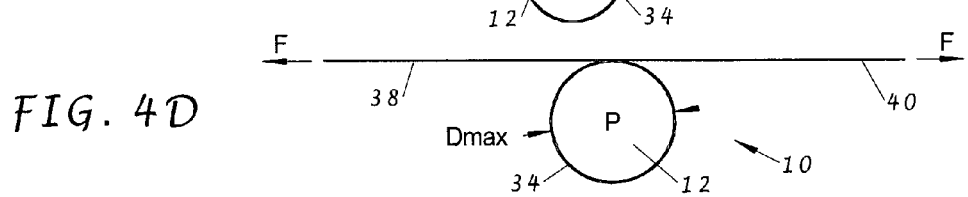

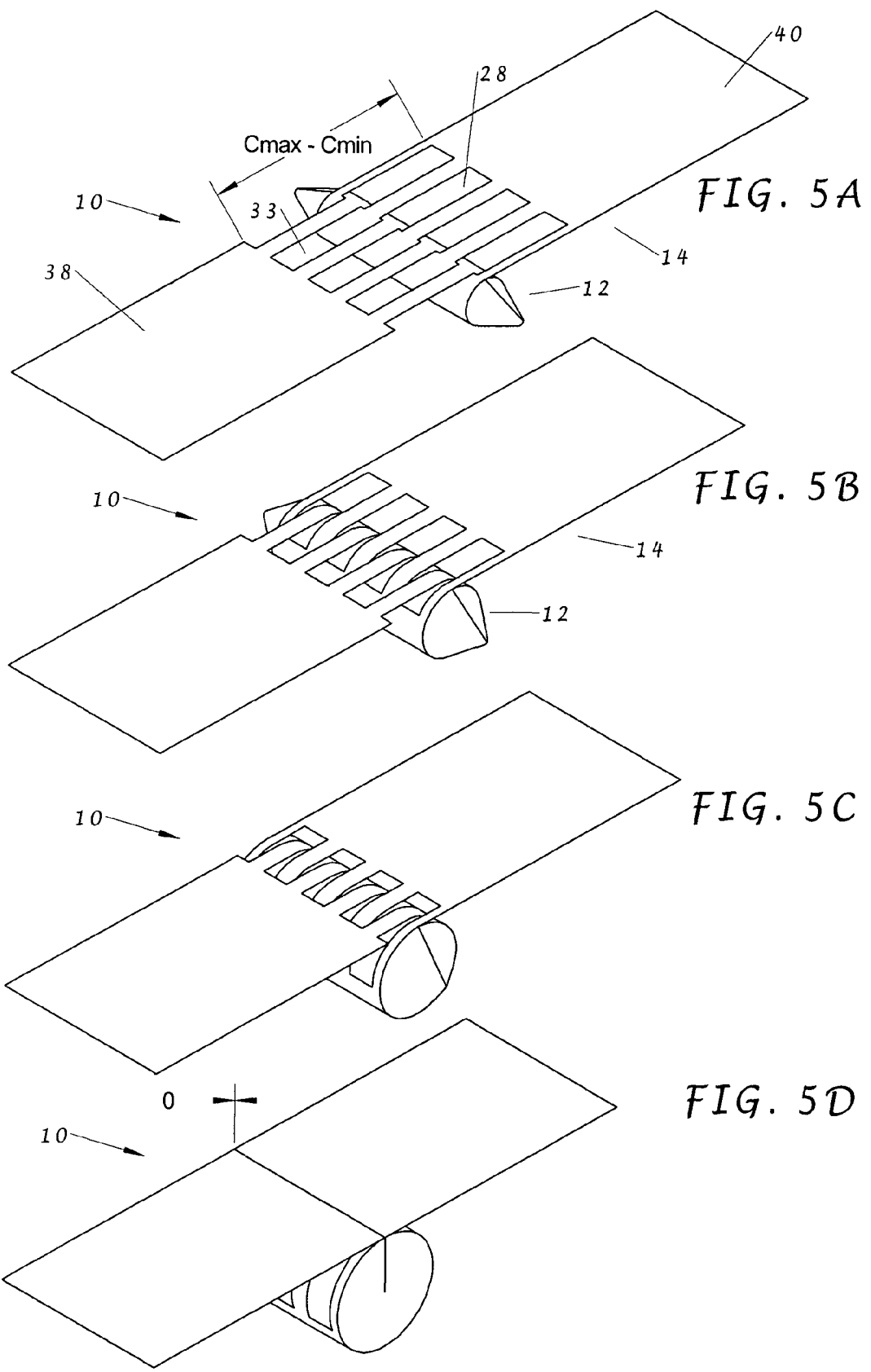

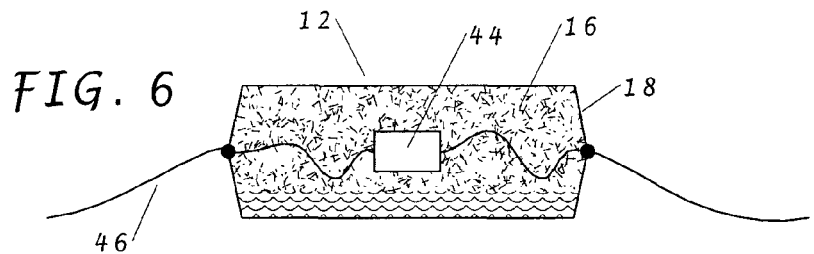
FIG. 6
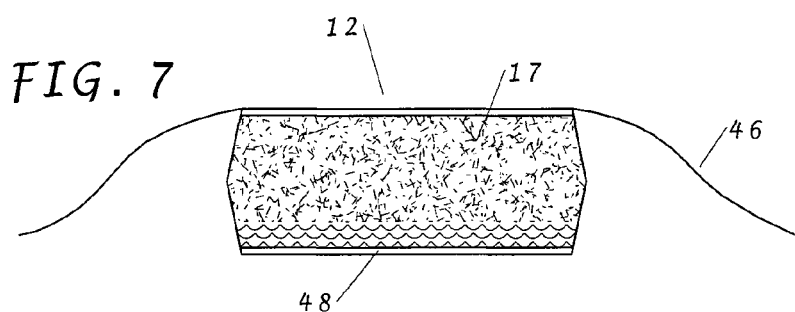
FIG. 7
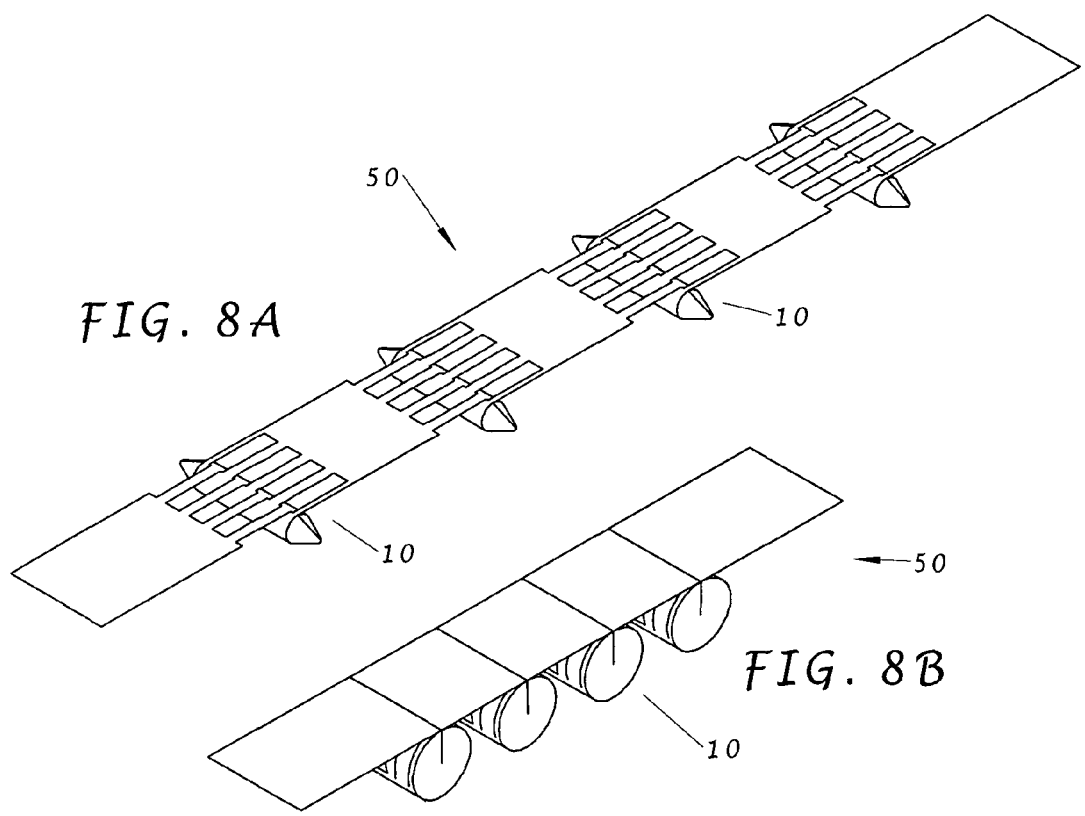
FIG. 8A
FIG. 8B

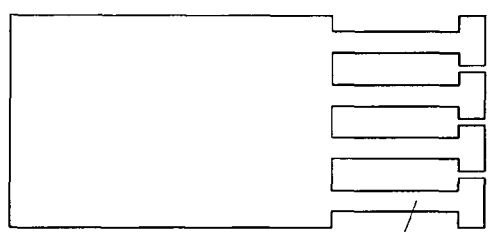
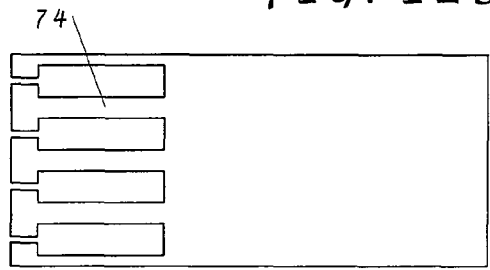
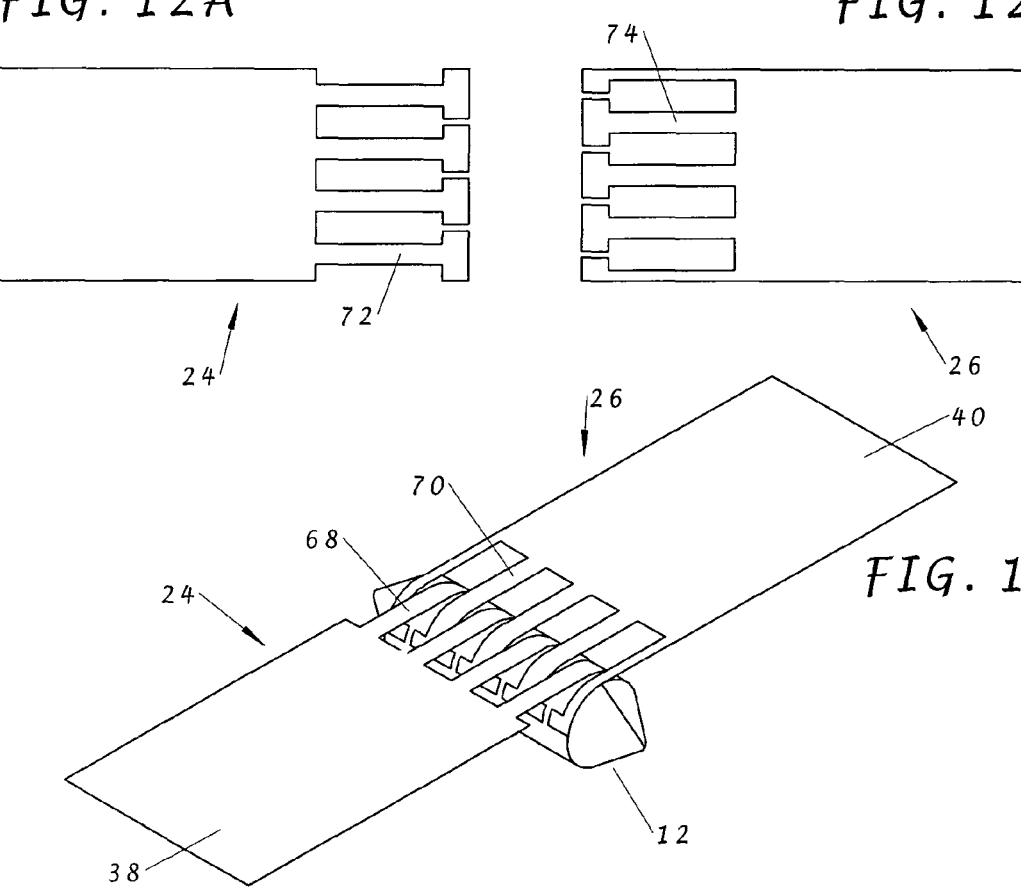

ARTIFICIAL MUSCLES

This invention relates to artificial muscles as might be used, for example, in robots and toys, or as prosthetics.

Various known devices and techniques exist to provide a linear and rotary actuation force, such as: a motorised screw, a solenoid, a voice coil, piezo-electrics, electrostatics, electrostrictive devices, elastomeric dielectric actuation, magnetostrictive devices, pneumatics, hydraulics and shape memory devices. In the field of robotics, where a linear actuator is to be used to mimic a human muscle, there are a number of important requirements. In the main these are: high power to weight ratio, ability to deliver a very high pulling force far above the actual load due to the leveraging involved, a fast response when performing a single jerking action, rapid relaxation, endurance for slower repeated actions, ease of mechanical application to a robot skeleton and ease of drive. None of the known devices or techniques in their known implementations provides a good balance between these requirements, particularly high strength to weight ratios. None of them appear to deliver simple scalability from very small single muscles, up to very large and powerful muscle groups.

Generally speaking pneumatic devices are considered as having potentially the right mix of requirements. However in their present form they are difficult to drive needing a source of air pressure, which is often very heavy and compromises the overall strength to weight ratio of the equipment and they require bulky and complex valves to control the air pressure. The current devices do not allow scalability and easy integration into toys, animatronics and prosthetic or robotic devices.

An aim of the present invention, or at least of specific embodiments of it, is to provide an artificial muscle that enables the requirements mentioned above to be satisfied in a more balanced way, in particular providing a high force to weight ratio (in which the weight includes the entire actuator and energy source), fast response, ease of control, scalability from small to large applications, and low cost.

In accordance with a first aspect of the present invention, there is provided an artificial muscle comprising: a chamber having a flexible wall of plastics material; means for heating and/or cooling a low-boiling-point fluid contained in, or in communication with, the chamber so that at least some of the fluid changes state between liquid and gaseous so that the force in the chamber on the flexible wall changes and/or the flexible wall moves to change the volume of the chamber; and means for transmitting the force on and/or movement of the flexible wall to a load.

The use of a low-boiling-point fluid operating at around its boiling point enables plastics materials to be used without thermal damage, and the use of plastics materials enables low production costs. The use of a flexible wall to convey force and/or movement to a load avoids the need for sliding parts as in, for example, a piston-and-cylinder arrangement, and can provide advantages such as reduced friction and ease of sealing. The use of a low-boiling-point fluid operating at around its boiling point also enables large changes in pressure to be achieved with relatively small changes in temperature, so that the muscle can operate over a relatively small temperature range. The use of a low-boiling-point fluid operating at around its boiling point also reduces the risk of personal injury.

The fluid preferably has a boiling point at the lowest pressure to which it will normally be exposed that is within 30° C. of the temperature of the surroundings in which the muscle is used. The fluid preferably has a boiling point at the lowest pressure to which it will normally be exposed that is higher than the temperature of the surroundings in which the muscle is used, so that heating, rather than cooling, is normally required initially to change the state of the fluid between liquid and gaseous. In the case where the muscle is to be used in surroundings at room temperature, the boiling point of the fluid may, for example, be in the range of 20 to 50° C. In a prototype of the invention, the fluid used was a hydrofluoroether having a boiling-point of 34° C. at 1 atmosphere (101 kPa), In one embodiment of the invention, the low-boiling-point fluid is contained in the chamber and the heating and/or cooling means is arranged to heat and/or cool the fluid in the chamber so that at least some of the fluid changes state between liquid and gaseous. This enables the fluid to be completely sealed in the chamber.

In another embodiment of the invention, the artificial muscle further includes a second chamber communicating with the first-mentioned chamber for containing some of the fluid; and means for controllably causing fluid to move between the second and first chambers such that at least some of the moved fluid changes state between liquid and gaseous. The second chamber is preferably much smaller than the first chamber.

In one arrangement, the movement causing means may include the heating and/or cooling means which is arranged controllably to heat and/or cool the fluid in the second chamber so that fluid moves between the second and first chambers. In this way the fluid in the preferably smaller second chamber and the heating and/or cooling means can be placed in close proximity. If the controllable heating and/or cooling means instead acted on the first chamber, the fluid and heating and/or cooling means might come out of close proximity when the first chamber expands unless there is lots of fluid in the first chamber. However if there is necessarily copious fluid, then much more energy is needed to heat or cool all the fluid up or down to a temperature. So the second chamber can act as an evaporation or condensing point designed to optimise heat transfer between the heating and/or cooling means and the fluid.

In another arrangement, the movement causing means includes means for controllably varying the volume of the second chamber so that fluid moves between the second and first chambers, and the heating and/or cooling means is arranged to heat and/or cool the fluid which has moved so that it changes state between liquid and gaseous. Thus, controlled amounts of liquid can be pumped from the second chamber to the first chamber where the liquid is then evaporated, or controlled amounts of gas can be sucked from the first chamber to the second chamber where the gas is then condensed.

In either arrangement, the first and second chambers may form part of a circuit around which the fluid can move, and the fluid can vent between the first chamber and the remainder of the circuit, preferably with first valve means being provided which is controllable to vary the rate at which the fluid can vent between the first chamber and the remainder of the circuit. In the case where liquid moves from the second chamber to the first chamber and is evaporated to stimulate the muscle, the venting means can be controlled to control relaxation of the muscle. The muscle may further include second valve means to permit flow of the fluid between the first and second chambers in only one direction, for example from the second chamber to the first chamber in the case where liquid moves from the second chamber to the first chamber and is evaporated to stimulate the muscle. The second valve means may comprise a pressure release valve.

In a known artificial muscle of the McKibben type, a chamber in the shape of a long sausage has tendons extending in opposite directions from the ends of the chamber, and the flexible chamber wall is reinforced with inextensible threads extending between the ends of the chamber so that the shortest distance along the chamber wall from one end of the chamber to the other is substantially constant. When the chamber is inflated, for example with compressed air, it transforms in shape from sausage-shaped, via generally-ellipsoidal, to a limiting shape which is generally spherical, and the tendons are progressively pulled together. If the distance between the ends of the chamber when the chamber is fully deflated is L, then the distance between the ends of the chamber when the chamber is fully inflated is about 2 L/(pi). The muscle can therefore contract to only about ⅔ of its relaxed length.

The artificial muscle of the first aspect of the invention may be of the McKibben type. However, alternatively, the force and/or movement transmitting means of the artificial muscle of the first aspect of the invention preferably includes a tendon which at least partly encircles the chamber over an extent that varies with variations in the chamber volume. As will be appreciated from the following detailed description of the invention, this can provide less of a restriction on the operating range of the muscle.

This latter preferred feature of the first aspect of the invention may be used with artificial muscles of other types, for example actuated by compressed air rather than by heating or cooling of a low-boiling-point fluid. Therefore, in accordance with a second aspect of the invention, there is provided an artificial muscle comprising a variable volume chamber, means for varying the volume of and/or pressure in the chamber, and means for transmitting force and/or movement between the chamber and a load, wherein the force and/or movement transmitting means includes a tendon which at least partly encircles the chamber over an extent that varies with variations in the chamber volume.

Preferably, the tendon has a pair of tendon portions which: extend from respective distal points towards the chamber in mutually opposite directions to a crossing region; cross each other at the crossing region; and thence extend at least partly around the chamber in mutually opposite directions. Each tendon portion preferably has a plurality of finger portions which are interdigitated with the finger portions of the other tendon portion. This can be used to provide a more balanced force transfer between the chamber and the tendon portions.

In a preferred embodiment, the chamber has a generally cylindrical side wall which varies in outside diameter with variations in the volume of the chamber, and the tendon at least partly encircles the side wall. The side wall could be of a stretchable material, but this would then result in sliding between the side wall and the tendon and consequent frictional losses. Preferably, the side wall is of flexible, substantially-inextensible material, and, in use, the chamber decreases in outside diameter by forming an inwardly projecting fold in the side wall of increasing size. The chamber is preferably arranged so that in use the fold forms in the region of the crossing region of the tendon portions. As will be appreciated from the following detailed description, any sliding movement between the tendon portions and the side wall of the chamber can therefore be substantially eliminated.

The artificial muscle may be employed in combination with at least one other such artificial muscle, each tendon being in common with or acting in common with the other tendon(s), for example in series to provide greater contraction and/or in parallel to achieve a greater effort.

The invention also extends to a device in the form of a robot or toy, or an exoskeleton for fitting to a person, the device having at least one muscle in accordance with the first and/or second aspect of the invention.

Specific embodiments of the present invention will now be described, purely by way of example, with reference to the accompanying drawings, in which:

FIG. 1 is an isometric view of a chamber of an artificial muscle;

FIG. 2 is an isometric view of a tendon of the artificial muscle;

FIG. 3 is a development of the tendon;

Figure 9:
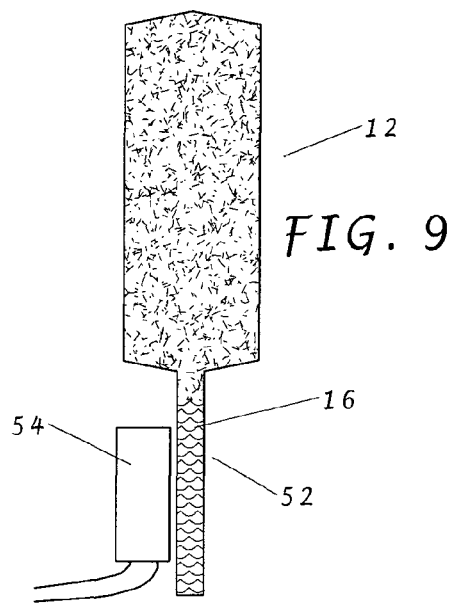
Figure 10:
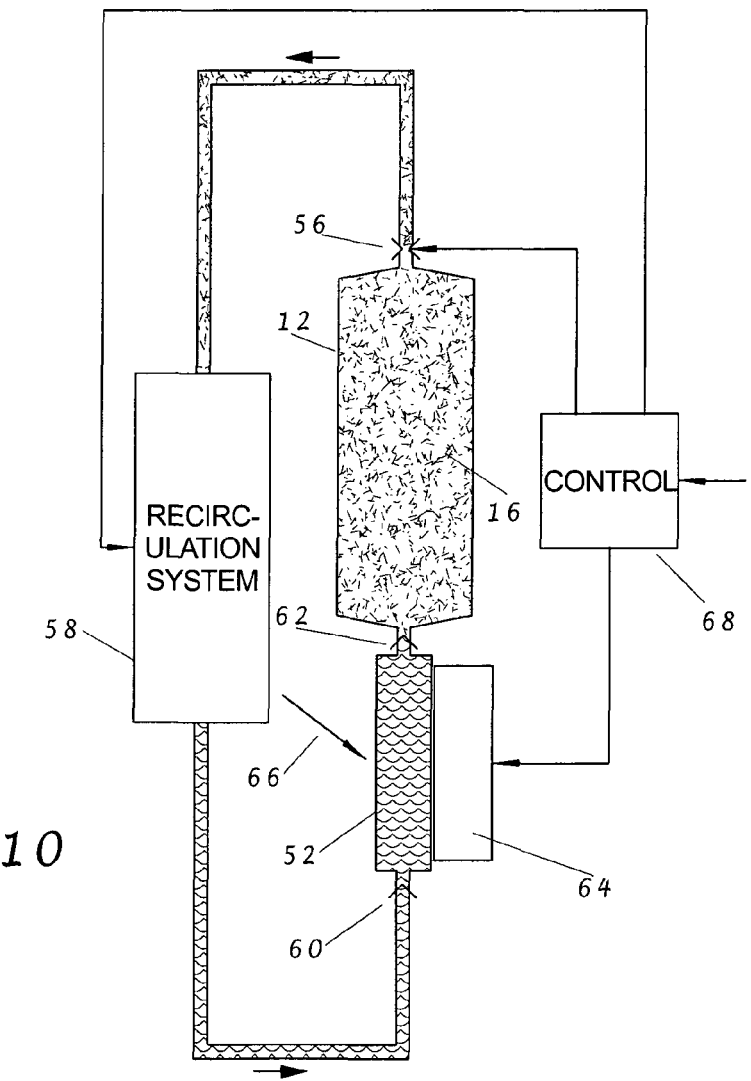
Figure 11:
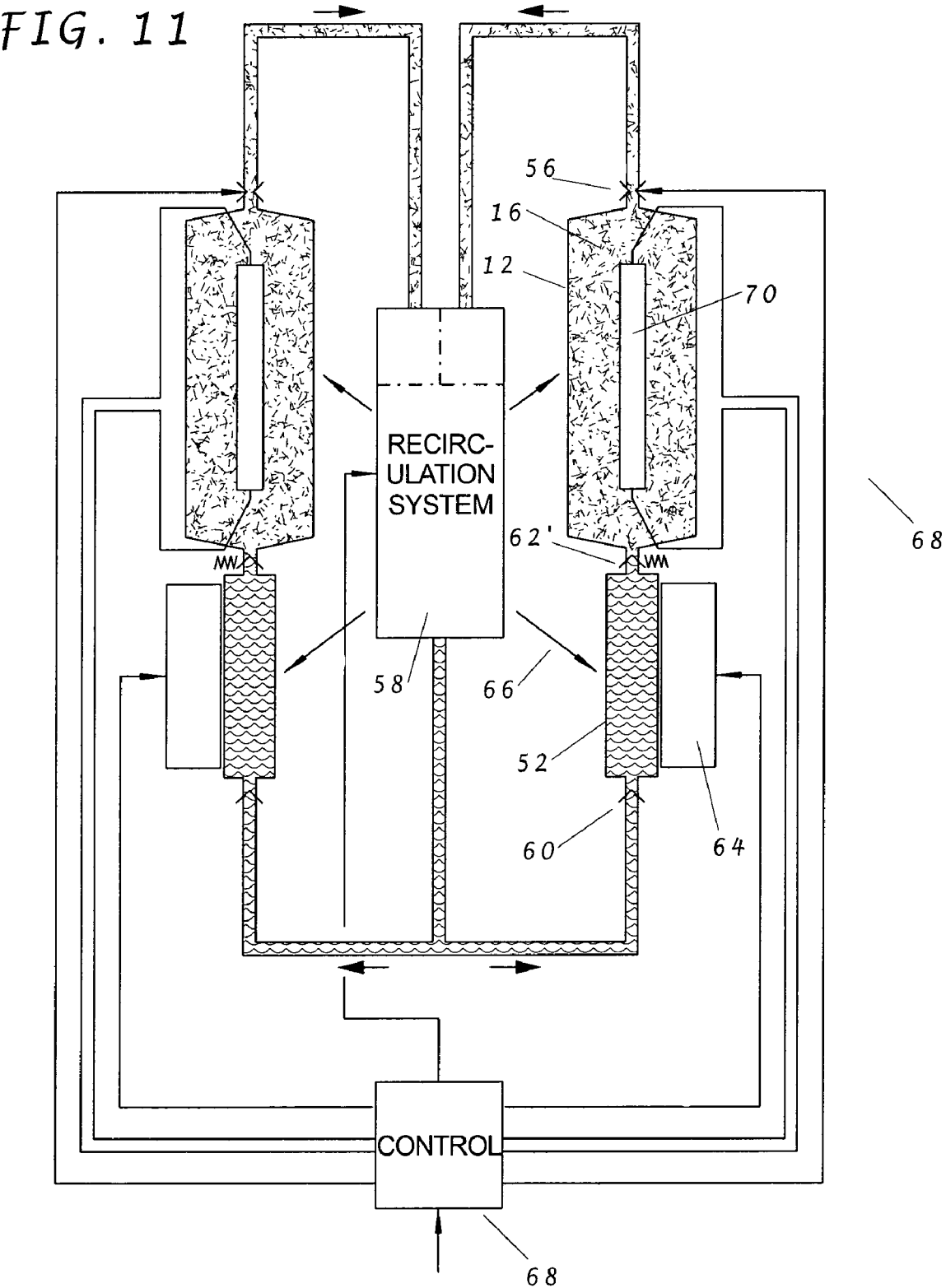

FIGS. 4A-D are sectioned end views of a single-chambered muscle at various stages of contraction;

FIGS. 5A-D are isometric views of the single chambered muscle at various stages of contraction;

FIGS. 6-7 are side views of the muscle chamber showing alternative ways of actuating it;

FIGS. 8A-B are isometric views of a multi-chambered muscle at minimum and maximum contraction;

FIG. 9 is a side view of a modified muscle chamber showing a further way of actuating it;

FIG. 10 is a side view of another modified muscle chamber and a schematic illustration of a system for actuating it;

FIG. 11 is a side view of two further modified muscle chambers and a schematic illustration of a system for actuating them;

FIGS. 12A-B are plan views of a modified tendon;

FIG. 13 is an isometric view of a muscle employing the modified tendon of FIGS. 11A-B when partly contracted.

Referring to FIGS. 1 to 5D, an artificial muscle 10 comprises a generally-cylindrical chamber 12 around which a tendon 14 is wound and which contains a low-boiling-point fluid 16.

The chamber 12 is formed from a side wall 17 and end walls 18 of thin plastics material which is flexible but substantially inextensible, for example a lamination of 12 micron biaxially-oriented nylon and 60 micron PE-EVOH-PE (polyethylene-ethyl vinyl alcohol-polyethylene) When the chamber 12 is inflated as shown in FIG. 1, the side wall 16 is generally cylindrical, having a diameter $D_{max}$ and length L, and the end walls 18 are generally circular, also having diameters $D_{max}$. The side wall 16 has a longitudinal crease 20 extending between from one end wall 18 to the other, and each end wall 18 has a radial crease 22 extending from its centre to the longitudinal crease 20.

The tendon 14 is formed from two pieces 24,26 of thin sheet plastics material which are flexible but substantially inextensible. The piece 24 is rectangular having a width W equal to the length L of the chamber 12. The piece 26 is also generally rectangular, having a width W equal to the length L of the chamber 12, but longer than the piece 24 and has four parallel slots 28 arranged across its width and five cutaways at one end so that so that four parallel fingers 30 are formed between the cutaways, each finger 30 being transversely aligned with and slightly narrower than a respective one of the slots 28. The ends of the fingers 30 of the piece 26 are secured adjacent one edge 32 of the piece 24 by welding or adhesive to form further slots 33 between the fingers 30, after each finger 30 has been passed through its respective slot 28, to form the tendon 14 with the configuration shown in FIG. 2. In development as shown in FIG. 3, the fingers 30 are longitudinally spaced from the slots 28 by a distance $C_{min}$, and the edge 32 of the piece 24 is longitudinally spaced from the far end of the slots 28 by a distance $C_{max}$. When assembled, as shown in FIG. 2, the tendon 14 therefore has a central cylindrical portion 34 whose circumference can be varied between $C_{min}$ and $C_{max}$ depending on how far the fingers 30 project from the slots 28. The maximum circumference $C_{max}$ is chosen to be about equal to the circumference (pi)$D_{max}$ of the chamber 12 when inflated. In the example, the minimum circumference $C_{min}$ is chosen to be about 40% of the maximum circumference $C_{max}$.

The low-boiling-point fluid 16 is sealed in the chamber 12 without any air. The low-boiling-point fluid 16 has a boiling point that is slightly higher than the ambient temperature of the environment in which the artificial muscle 10 is to be used. For example, if the muscle 10 is to be used in an ambient temperature of 20° C., the low-boiling-point fluid 16 may be 3M® Novec® HFE-7000 hydrofluoroether which has a boiling-point of 34° C. at 1 atmosphere (101 kPa), and a heat of vaporisation of 142 kJ/kg. The quantity of the fluid 16 depends on the maximum effort which the muscle 10 is required to produce.

The muscle 10 is assembled by placing the chamber 12 coaxially in the cylindrical portion 34 of the tendon 14 so that the longitudinal crease 20 in the side wall 17 of the chamber 12 is centralised with respect to the slots 28 and fingers 30 of the tendon 14. In order to maintain alignment, the chamber 12 may be secured to the tendon 14 by welding or adhesive in the region 36 (FIG. 3) of the tendon 14 between the slots 28 and fingers 30. The tendon 14 therefore has a cylindrical portion 34 which is wrapped around the chamber 12 and tendon portions 38,40 which extend in opposite directions from the cylindrical portion 34 and which, in use, are secured to a load.

Referring specifically to FIGS. 4A-5D, in use, the diameter D of the chamber 12 varies, depending of the pressure P in the chamber and the load F applied to the tendon portions 38,40, between a minimum $D_{min}$, which is about equal to $C_{min}/(pi)$, and the maximum $D_{max}$, which is about equal to $C_{max}/(pi)$. When the diameter D is less than the maximum diameter $D_{max}$, the side wall 17 of the chamber 12 folds inwardly, led by the crease 20, to form a double-skinned flap 42 (FIGS. 4A-C) within the cylindrical outline of the chamber 12, and the end walls 18 of the chamber 12 bulge outwardly (FIGS. 5A-C) and fold inwardly.

The fluid 16 in the chamber 12 may be heated in a number of ways. For, example, FIG. 6 shows an electrically-resistive heater element 44 disposed within the chamber 12 and connected by leads 46 passing through and sealed to the end walls 18 of the chamber 12 so that electrical current can be passed through the heater element 44. FIG. 7 shows an electrically-resistive film 48 wrapped around; or forming part of, the side wall 17 of the chamber 12 and connected by leads 46 so that electrical current can be passed through the film 48.

When the chamber 12 is collapsed as shown in FIG. 4A and the fluid 16 in the chamber 12 is heated to near the boiling point, the fluid begins to boil and change phase to a gas. The gas typically occupies ten to twenty times the volume of the fluid. Therefore the chamber 12 begins to expand under the pressure of the gas as shown in FIGS. 4B to 4D. However the chamber expansion will depend on the tension in the tendon 14, resulting in a compression of the chamber. If the tendon 14 is locked and no chamber expansion is possible, then the chamber gas pressure will increase as a function of the amount of heat energy input by the heating elements and any heat loss. Since the temperature of the chamber 12 is close to the liquid boiling point temperature, in the main the energy delivered is used to vaporise the fluid rather than increase the temperature of the gas. However as the pressure builds in the chamber 12 so the fluid's boiling point temperature increases.

If the tendon tension acts so as to compress the chamber 12, the gas compresses and a fraction of the gas condenses back to liquid provided the pressure is high enough. In this situation the temperature of the fluid also may increase.

If the tendon tension results in the muscle load moving in the direction of the tension, then the result is that, the tendon slackens slightly and allows the chamber the possibility to expand further. To maintain the tension force, more of the liquid in the chamber 12 must be converted to gas and therefore more heat energy must be delivered.

When the heat energy supplied to the fluid is switched off, the contents of the chamber 12 will begin to cool. As the gas cools it will condense back to a fluid and the chamber 12 deflates. The speed of deflation will depend on the rate of cooling. The cooling may be natural cooling by convection and radiation or may be assisted by passing a cooling fluid over the chamber walls. The condensation may require additional pressure as well as cooling to convert all vapour back to the liquid phase.

A number of modifications may be made to the elemental artificial muscle 10 described above. For example, FIGS. 8A-B show four elemental muscles 10 having their tendons joined together in series to form a compound muscle 50 which can produce four times as much contraction as the elemental muscle 10 and the same effort. The elemental muscles 10 need not be of the same design in the compound muscle 50. For example, the elemental muscles 10 may be arranged to produce contractions in a powers-of-two series, so that the smallest muscle 10 can produce a small contraction X, the largest muscle 10 can produce eight times that contraction 8×, and the compound muscle 50 as a whole can produce a contraction of 15×. The elemental muscles can be independently driven. Alternatively, elemental muscles 10 may be arranged with their tendons joined together in parallel to form a compound muscle 50 which can produce more effort than each elemental muscle 10. Again, the elemental muscles 10 need not be of the same design in the compound muscle 50.

FIG. 9 shows a further way of operating the muscle chamber 12. In this case, the chamber 12 is in fluid communication with a smaller heating chamber 52 beneath the expansion chamber 12. The liquid part of the fluid 16 therefore drains due to gravity into the heating chamber 52 and/or is squeezed into the heating chamber 52 upon contraction of the muscle chamber 12. The volume of the heating chamber 52 does not vary significantly in use. The wall of the heating chamber 52 is in thermal communication with a Peltier device 54 which can be electrically driven to heat or cool, depending on the electrical polarity, the heating chamber 52 and the fluid 16 in it.

FIG. 10 shows modification in which the fluid 16 is not sealed in the expansion chamber 12 and heating chamber 52, but instead can flow from an outlet of the expansion chamber 12 via a controllable restrictor valve 56, a recirculation system 58, a one-way valve 60, the heating chamber 52 and a further one-way valve 62 back to the expansion chamber 12. The recirculation system 58 acts to cool fluid 16 received from the expansion chamber 12 and to pump it to the heating chamber 52. The fluid 16 in the heating chamber 52 can be controllably heated by an electrically-resistive heater element 64 attached to the wall of the heating chamber 52 or disposed inside the heating chamber 52. The heating chamber 52 can also receive background heating from waste heat 66 produced by the recirculation system 58. The restrictor valve 56, recirculation system 58 and heater element 64 are controlled by a control unit 68 in dependence upon an input signal, and the control unit 68 may also receive feedback signals from the system. The one-way valve 62 prevents the pressure in the expansion chamber 12 being reflected back into the heating chamber 52, and the one-way valve 60 prevents the pressure in the heating chamber 52 being reflected back into the recirculation system 58.

In the arrangement of FIG. 10, the liquid in the heating chamber 52 can be rapidly heated by the heater element 64 to produce gas which passes through the one-way valve 62 into the expansion chamber 12. When the heating is applied, the control unit 68 can decide to what extent the restrictor valve 56 should be closed.

For example, the valve 56 could initially be fully open while the chamber fills with gas so that gas exhausts almost immediately into the recirculation system 58 without any significant pressure building up in the expansion chamber 12. Subsequently, the valve 56 may be suddenly closed, as a result of which the chamber 12 will expand most rapidly to cause sudden contraction of the tendon 14 and/or a sudden increase in the effort provided by the tendon.

Alternatively, the valve 56 could be left half open, such that the chamber 12 would be kept in a semi exhaust state. Such a state is useful to make the muscle 10 seem soft, weak or compliant to external tension. The state'also allows for rapid switching between fully relaxed and full pressure states.

Normally, the valve 56 is closed when heat is applied and this stops any exhaust of gas. The pressure in the chamber 16 then depends on the heat input and the local heat losses. If the pressure needs to be reduced, then the valve is opened by the control unit 68 for a period and amount according to the required pressure profile.

Once in the recirculation system 58, the gases are actively cooled using any heat pump arrangement. Some pressure may also be applied to assist the condensation as well as to push condensed fluids back towards the heating chamber 52. The cooling heat pump may be arranged such that the drawn off heat energy is circulated back to the areas around the heating chamber 52 and the expansion chamber 12 so as to maintain the temperature of the heating chamber 52 no lower than just below the boiling point of the fluid 16 and, if possible to maintain the temperature of the chamber 12 just below or perhaps even just above the boiling point.

When the muscle is being used for prolonged periods, the fluid in the two chambers 52,12 may become totally converted to gas phase. In this situation the muscle has been driven beyond its capacity and must be rested. To do this, the exhaust valve 56 is opened to reduce pressure in the chambers 12,52. As soon as this occurs, the fluid pumped from the recirculation system may enter the heating chamber 52 and prime it ready to drive gas into the expansion chamber as required.

In a modification to the arrangement shown in FIG. 10, as shown in FIG. 11, the one-way valve 62 is replaced by a one-way, pressure-release valve 62' which allows fluid to flow from the heating chamber 52 to the expansion chamber 12 only when the pressure differential across the pressure release valve exceeds a predetermined value. In addition, the expansion chamber 12 has a heating element 70, under control of the control unit 68 as part of its walls or heating flexible heat transfer elements, such as heat conductive silicone fibres permeating the volume of the chamber 12. In use, liquid enters the chamber 52 under the pressure of the recirculation system 58. As this pressure is below the setting of the pressure release valve 62' between the chambers 52,12, no fluid initially enters the chamber 12 under this pressure alone. However, if the heating element 64 of the chamber 52 is activated, the liquid in this chamber 52 boils and the chamber fluid comes under pressure from the expanding vapour phase. When the pressure exceeds the release valve limit, gas and liquid are forced into the chamber 12. In this arrangement, the walls and internal volume of the chamber 12 can be heated to the boiling point or higher, such that any liquid entering it is converted immediately to gas and any gas in it remains in the gaseous state. If the exhaust valve 56 of the chamber 12 is open, the gas exhausts into the recirculation system. If it is closed, the chamber 12 expands. This arrangement overcomes the problem described in relation to FIG. 10 in which the chamber 12 can become partly flooded with liquid, by liquid leaking from the chamber 52, or by condensed gas, which inhibits optimal reaction as this fluid acts as a thermal load.

FIG. 11 also shows how, in a multiple chamber muscle system as shown for example in FIGS. 8A and 8B, more than one set of chambers 12,52 with associated valves 56,60,62' and heaters 64,70 may share a common control unit 68 and, at least in part, a common recirculation system 58.

In a further modification of the arrangement shown in FIG. 11, the controllable heating element 64 for the chamber 52 is replaced by a device, such as a piezoelectric element, that can be controlled by the control unit 68 to vibrate the wall of the chamber 52 so that, with its valves 60,62', it acts as a pumping chamber rather than a heating chamber. Accordingly, in use, liquid enters the chamber 52 under the pressure of the recirculation system 58. As this pressure is below the setting of the pressure release valve 62' between the chambers 52,12, no fluid initially enters the chamber 12 under this pressure alone. However, if the piezoelectric element of the chamber 52 is activated, a controlled volume of the liquid in this chamber 52 is forced through the pressure release valve 62' into the chamber 12. The walls and internal volume of the chamber 12 are heated to above the boiling point, such that the liquid entering it is converted immediately to gas and any gas in it remains in the gaseous state. Again, if the exhaust valve 56 of the chamber 16 is open, the gas exhausts into the recirculation system. If it is closed, the chamber 12 expands.

FIGS. 12A-13 show a modified tendon arrangement in which the pieces 24,26 of thin sheet material that form the tendon are not attached to each other but instead are each formed with interdigitating fingers 72,74 the ends of which are attached to the side wall 17 of the chamber 12.

In the embodiments of the invention described above, the fluid 16 is normally liquid and is heated in the heating chamber 52 or expansion chamber 12 so as to expand the expansion chamber. The embodiments may be modified so that, instead, the fluid 16 is normally gaseous and is cooled in the chamber 52 so as to allow the chamber 12 to contract.

It should be noted that the embodiments of the invention have been described above purely by way of example and that many other modifications and developments may be made thereto within the scope of the present invention.

The invention claimed is:

1. An artificial muscle comprising:
   a first chamber having a flexible wall of plastics material;
   a second chamber;
   a low-boiling-point fluid in the chambers;
   first valve means for permitting flow of the fluid through the first valve means between the second and first chambers in only a first direction;
   venting means for permitting the fluid to vent through the venting means between the first and second chambers in a second direction opposite to said first direction, wherein the venting means is a tube allowing the passage of fluid out of the expansion chamber via a controllable restrictor valve and onto a recirculation system;
   controllable operating means for heating and/or cooling the fluid and for controllably causing fluid to move through the first valve means between the first and second chambers so that at least some of the moved fluid changes state between liquid and gaseous and at least one of:

the force of the fluid in the first chamber on the flexible wall changes, and the flexible wall moves to change the volume of the first chamber; and force and/or movement transmitting means for transmitting the force on and/or movement of the flexible wall to a load, wherein the controllable operating means comprises a control unit, wherein the control unit operably connects to (a) the heater element, (b) the controllable restrictor valve, and (c) the recirculation system.

2. An artificial muscle as claimed in claim 1, wherein the boiling point of the fluid is in the range of 20 to 50° C.

3. An artificial muscle as claimed in claim 1, wherein the controllable operating means includes means which is arranged controllably to heat and/or cool the fluid in the second chamber so that fluid moves through the first valve means in said first direction between the second and first chambers.

4. An artificial muscle as claimed in claim 1, wherein the controllable operating means includes means for controllably varying the volume of the second chamber so that fluid moves through the first valve means in said first direction between the second and first chambers, and means for heating and/or cooling the fluid which has moved so that it changes state between liquid and gaseous.

5. An artificial muscle as claimed in claim 1, further including second valve means which is controllable to vary the rate at which the fluid can vent through the venting means in said second direction between the first chamber and the second chamber.

6. An artificial muscle as claimed in claim 1, wherein the first valve means comprises a pressure release valve.

7. An artificial muscle as claimed in claim 1, wherein the force and/or movement transmitting means including a tendon which at least partly encircles the chamber over an extent that varies with variations in the chamber volume.

8. An artificial muscle as claimed in claim 7, wherein the tendon has a pair of tendon portions which: extend from respective distal points towards the chamber in mutually opposite directions to a crossing region; cross each other at the crossing region; and thence extend at least partly around the chamber in mutually opposite directions.

9. An artificial muscle as claimed in claim 8, where each tendon portion has a plurality of finger portions which are interdigitated with the finger portions of the other tendon portion.

10. An artificial muscle as claimed in claim 7, wherein the chamber has a generally cylindrical side wall which varies in outside diameter with variations in the volume of the chamber, and the tendon at least partly encircles the side wall.

11. An artificial muscle as claimed in claim 10, wherein the side wall is of flexible, substantially-inextensible material, and, in use, the chamber decreases in outside diameter by forming an inwardly projecting fold in the side wall of increasing size.

12. An artificial muscle as claimed in claim 8, wherein: the chamber has a generally cylindrical side wall which varies in outside diameter with variations in the volume of the chamber; the tendon at least partly encircles the side wall; the side wall is of flexible, substantially-inextensible material, and, in use, the chamber decreases in outside diameter by forming an inwardly projecting fold in the side wall of increasing size; and the chamber is arranged so that in use the fold forms in the region of the crossing region of the tendon portions.

13. An artificial muscle as claimed in claim 7 in combination with at least one other artificial muscle as claimed in claim 7, each tendon being connected in series or in parallel with at least one other of the tendons.

14. A device in the form of a robot or toy, or an exoskeleton for fitting to a person, the device having at least one muscle comprising:

a first chamber having a flexible wall of plastics material;

a second chamber;

a low-boiling-point fluid in the chambers;

first valve means for permitting flow of the fluid through the first valve means between the second and first chambers in only a first direction;

venting means for permitting the fluid to vent through the venting means between the first and second chambers in a second direction opposite to said first direction, wherein the venting means is a tube allowing the passage of fluid out of the expansion chamber via a controllable restrictor valve and onto a recirculation system;

controllable operating means for heating and/or cooling the fluid and for controllably causing fluid to move through the first valve means between the first and second chambers so that at least some of the moved fluid changes state between liquid and gaseous and at least one of the force of the fluid in the first chamber on the flexible wall changes, and the flexible wall moves to change the volume of the first chamber; and force and/or movement transmitting means for transmitting the force on and/or movement of the flexible wall to a movable member of the device, wherein the controllable operating means comprises a control unit, wherein the control unit operably connects to (a) the heater element, (b) the controllable restrictor valve, and (c) the recirculation system.

* * * * *